United States Patent
Barrieau et al.

(10) Patent No.: US 7,400,226 B2
(45) Date of Patent: Jul. 15, 2008

(54) EMERGENCY LIGHTING SYSTEM WITH IMPROVED MONITORING

(75) Inventors: Mark P. Barrieau, Baldwinville, MA (US); Johnpaul P. Barrieau, Gardner, MA (US); Jeffrey R. Brooks, Ashburnham, MA (US)

(73) Assignee: SimplexGrinnell LP, Westminster, MA (US)

( * ) Notice: Subject to any disclaimer, the term of this patent is extended or adjusted under 35 U.S.C. 154(b) by 280 days.

(21) Appl. No.: 10/934,711

(22) Filed: Sep. 3, 2004

(65) Prior Publication Data

US 2005/0057353 A1 Mar. 17, 2005

Related U.S. Application Data

(60) Provisional application No. 60/502,338, filed on Sep. 12, 2003.

(51) Int. Cl.
*G09F 25/00* (2006.01)

(52) U.S. Cl. .................. 340/286.01; 340/506; 340/511; 340/628

(58) Field of Classification Search ................... 340/514
See application file for complete search history.

(56) References Cited

U.S. PATENT DOCUMENTS

| | | | |
|---|---|---|---|
| 4,163,218 A * | 7/1979 | Wu | 340/310.12 |
| 4,255,746 A * | 3/1981 | Johnson et al. | 340/577 |
| 4,258,291 A * | 3/1981 | Scott et al. | 340/628 |
| 4,524,304 A * | 6/1985 | Todd | 340/628 |
| 4,567,557 A * | 1/1986 | Burns | 340/538 |
| 4,799,039 A | 1/1989 | Balcom et al. | |
| 4,977,353 A * | 12/1990 | Helal et al. | 340/636.2 |
| 5,154,504 A * | 10/1992 | Helal et al. | 340/531 |
| 5,349,330 A * | 9/1994 | Diong et al. | 340/567 |
| 5,397,963 A | 3/1995 | Manson | |
| 5,446,439 A | 8/1995 | Kramer et al. | |
| 5,815,068 A * | 9/1998 | Vadseth | 340/332 |
| 6,028,513 A * | 2/2000 | Addy | 340/539.16 |
| 6,285,132 B1 | 9/2001 | Conley, III et al. | |
| 6,426,697 B1 * | 7/2002 | Capowski et al. | 340/506 |
| 6,502,044 B1 | 12/2002 | Lane et al. | |
| 6,529,128 B2 * | 3/2003 | Weng | 340/539.1 |
| 6,538,568 B2 * | 3/2003 | Conley, III | 340/540 |
| 7,012,544 B2 * | 3/2006 | Cunningham et al. | 340/815.55 |
| 7,026,768 B1 * | 4/2006 | Ruiz | 315/185 R |
| 7,123,130 B2 * | 10/2006 | Bolta | 340/321 |

* cited by examiner

*Primary Examiner*—George A Bugg
*Assistant Examiner*—Eric M Blount
(74) *Attorney, Agent, or Firm*—Brinks Hofer Gilson & Lione

(57) ABSTRACT

An emergency lighting unit includes a lamp, a backup battery, and controller and a network interface. The controller connects the backup battery to the lamp upon detection of an emergency condition and loss of main power. The network interface interfaces with and receives commands via a fire alarm network. Each emergency lighting unit has a unique identifier with respect to the fire alarm network.

51 Claims, 4 Drawing Sheets

EMERGENCY LIGHTING SYSTEM WITH IMPROVED MONITORING

RELATED APPLICATION(S)

This application claims the benefit of U.S. Provisional Application No. 60/502,338, filed Sep. 12, 2003. The entire teachings of the above application(s) are incorporated herein by reference.

BACKGROUND OF THE INVENTION

Emergency lighting systems are dependent on battery backup to provide egress lighting when AC power has failed. Presently, emergency lighting units are provided with manual test capability. Typically, these units provide a test switch, or other manual means for initiating a test, which is held in the "ON" position for 90 seconds each month. The battery is tested by applying a load for the duration in which the switch is pressed.

This method of battery test is inadequate to properly measure actual battery capacity. For example, a given unit loads the battery with 1 Ampere during the 90 second load test. This is the same as the emergency lighting load. This load represents only a 0.025 Ampere-hour (Ah) discharge, and is not really an adequate representation of battery condition, since the actual system will be required to provide 90 minutes standby. Additionally, an annual test is intended to be done in order to measure actual battery capacity by fully discharging the batteries. This test requires significant labor, since a building can have many emergency lighting components.

U.S. Pat. No. 6,538,568, to Conley III, entitled "EMERGENCY LIGHTING REMOTE MONITORING AND CONTROL SYSTEM" teaches an emergency lighting unit identified by unique ID numbers. The unit communcates via wireless means with a central controller. Various commands from the central controller may include turning the lamp on and off, requesting a status, or initiating a battery voltage and lamp current tests.

SUMMARY OF THE INVENTION

Integration of Emergency Lighting Individual Addressable Modules (ELIAMs) according to an embodiment of the present invention with a fire alarm system allows for better monitoring at lower service cost. Automation of the test cycle is provided. Backup of a depleted battery following the test is provided by a signaling line circuit (SLC). This enables continuous monitoring of battery condition. Required monthly testing may be eliminated. Annual test requirements can be met monthly. A system trouble condition and annunciation via the fire alarm network or other means can provide notice that a specific battery requires replacement.

Integration of emergency lighting functions with a fire alarm system may be advantageous because the fire alarm system provides a higher level of monitoring than is typically provided by an emergency lighting system.

An ELIAM according to an embodiment of the present invention communicates with a fire alarm control panel using a network, such as a pre-existing fire alarm network. The ELIAM monitors battery capacity by fully discharging a battery at regular intervals, An ELIAM discharges the local battery on command from the system controller. The ELIAM monitors battery voltage and current during the discharge, thus providing an actual measurement of battery capacity.

An emergency lighting unit according to an embodiment of the present invention includes a lamp, a backup battery, and controller and a network interface. The controller connects the backup battery to the lamp upon detection of an emergency condition and loss of main power. The network interface interfaces with and receives commands via a fire alarm network. Each emergency lighting unit has a unique identifier with respect to the fire alarm network.

The controller, upon receiving a test command, causes the backup battery to discharge, while sensing the battery's state and forwarding battery state information via the network interface to a network or system controller, such as a fire alarm control panel. The battery state information may include an indication of at least one of: voltage across the battery and current draw from the battery.

The backup battery can be discharged through the light source, or alternatively, through a ballast load. Discharge may be for a preset period, or may be controlled by start and end commands received from the network controller. Discharge of the backup battery can also be terminated if the battery's terminal voltage drops below a predetermined threshold, in which case a trouble indication may be sent to the network controller. Troubles may be indicated when battery capacity is not adequate. For example, detection of no or low current during discharge may be interpreted to mean that the lamp is defective.

In at least one embodiment, backup power is delivered via the network while the battery is being discharged. Such backup power may be supplied by the network controller.

A test log may be maintained at the fire alarm control panel (FACP) or other system controller or network controller, to record the batter capacity of each emergency lighting battery. In one embodiment, the emergency lighting unit is capable of maintaining at least a limited test log and reporting the log to the network controller upon a command.

The emergency lighting unit may be one of plural similar units connected to the network, which each is assigned a unique address. The plural units can be tested, for example, on a periodic rotating schedule. In addition, there can be plural fire alarm appliances, such as smoke detectors, fire detectors, pull stations, intrusion detectors, motion sensors, and audible alarms connected to the network, where each device has been assigned a unique address.

In one embodiment, the emergency lighting unit inhibits the light source from turning on during an emergency condition that would normally cause the light source to be on. This may be, for example, in response to a command from a network controller, and the light source may be inhibited from turning on upon certain conditions; for example, if ambient light is adequate in the vicinity of the unit, that is, sensed ambient light has reached or passed a predetermined threshold; or if no movement has been detected in the vicinity of the unit within some time frame.

In at least one embodiment, a light sensor verifies that the lamp is activated. If the lamp appears not to be activated, the controller reports the detected fault via the network interface.

A method for testing emergency lighting according the present invention comprises: providing a backup battery, such that upon loss of main power, the backup battery supplies power to a lamp; upon receiving a test command from a fire alarm control panel (FACP) via a fire alarm network, discharging the backup battery; and reporting information about the backup battery acquired during discharge to the FACP.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
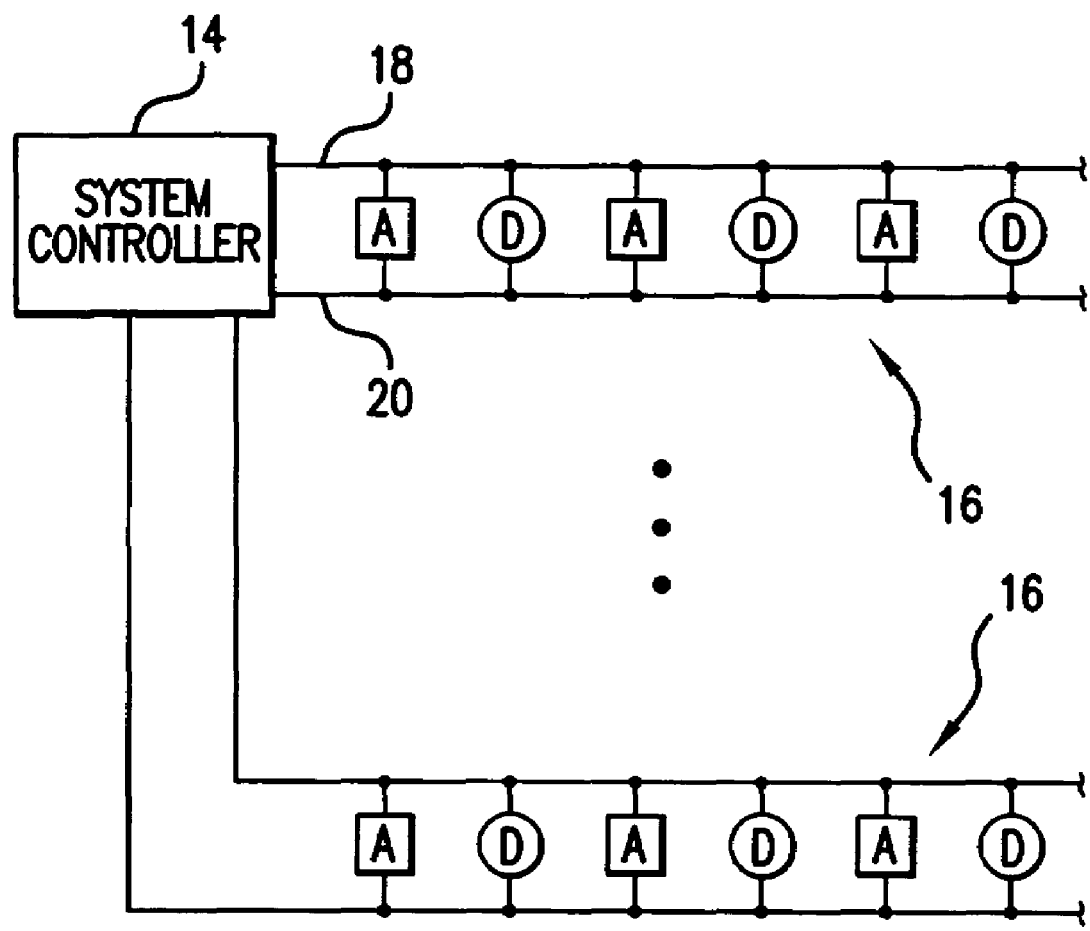
FIG. 1 is a schematic diagram illustrating an exemplary fire alarm network.

FIG. 1 is a schematic diagram illustrating an exemplary fire alarm network. The system includes one or more notification appliance circuits (NACs), i.e., networks 16, having alarm condition detectors D and alarm notification appliances A. Alternatively, the detectors and notification appliances may be on separate networks. The detectors D are monitored by a system controller 14. When an alarm condition is sensed, the system controller 14 signals the alarm to the appropriate notification appliances through one or more networks 16. Notification appliances may include, for example, a visual alarm (strobe), an audible alarm (horn), a speaker, or a combination thereof.

Although not necessary for carrying out the invention, as shown, all of the notification appliances in a network are coupled across a pair of power lines 18 and 20 that advantageously also carry communications between the system controller 14 and the notification appliances A.

Emergency lighting components according to an embodiment of the present invention may be integrated into a networked fire alarm system such as that illustrated in FIG. 1. Each emergency lighting component is an addressable module within the fire alarm system and communicates with a system controller over an addressable loop, or signaling line circuit (SLC), i.e., a fire alarm network.

The emergency lighting component is referred to hereafter as an Emergency Lighting Individual Addressable Module (ELIAM). According to one embodiment of the present invention, ELIAMs co-exist with other fire alarm peripherals, e.g., smoke detectors, pull stations, etc.

Each SLC is rated to allow the monitor and control a certain number of addressable modules. For example, in one embodiment, one SLC may allow 250 modules on a single SLC, thirty of which may be ELIAMS. A system may have multiple SLCs. (For example, the system of FIG. 1 has two SLCs 16.) A particular SLC may be designed to support a given number of ELIAMs, which may represent full or partial SLC capacity.

As an example, for a SLC that supports 250 devices, thirty of which may be ELIAMS, a monthly discharge test on each device can be performed. Each day, the system controller may command a single ELIAM to perform a discharge test. The SLC provides backup during the period when the battery is discharged in case of an AC failure during the battery test. The ELIAM converts the network power to the standby source in case of AC failure. Over the course of a month, all thirty devices on the SLC are tested completely. This exceeds the required test schedule, and provides early notification of a defective or depleted battery.

As the battery is discharged, the system records the discharge current and the battery voltage. Should the battery reach end of capacity, for example, 1.75V per cell with SLA batteries, discharge will cease. The discharge period can be set as desired or as required by local code. For example, many systems require 90-minute backup. In this case, the ELIAM would operate the emergency lights (or, alternately a ballast load simulating the emergency lights) for 90 minutes. If the terminal voltage (1.75V/cell in the example above) is reached before the 90 minutes, a trouble indication may be given.

The system may also verify that the emergency lamp is drawing the expected current draw. For example, if an ELIAM measures no or lower than expected current, it is likely that the emergency lamp is defective or that the bulb has burned out.

Figure 2:
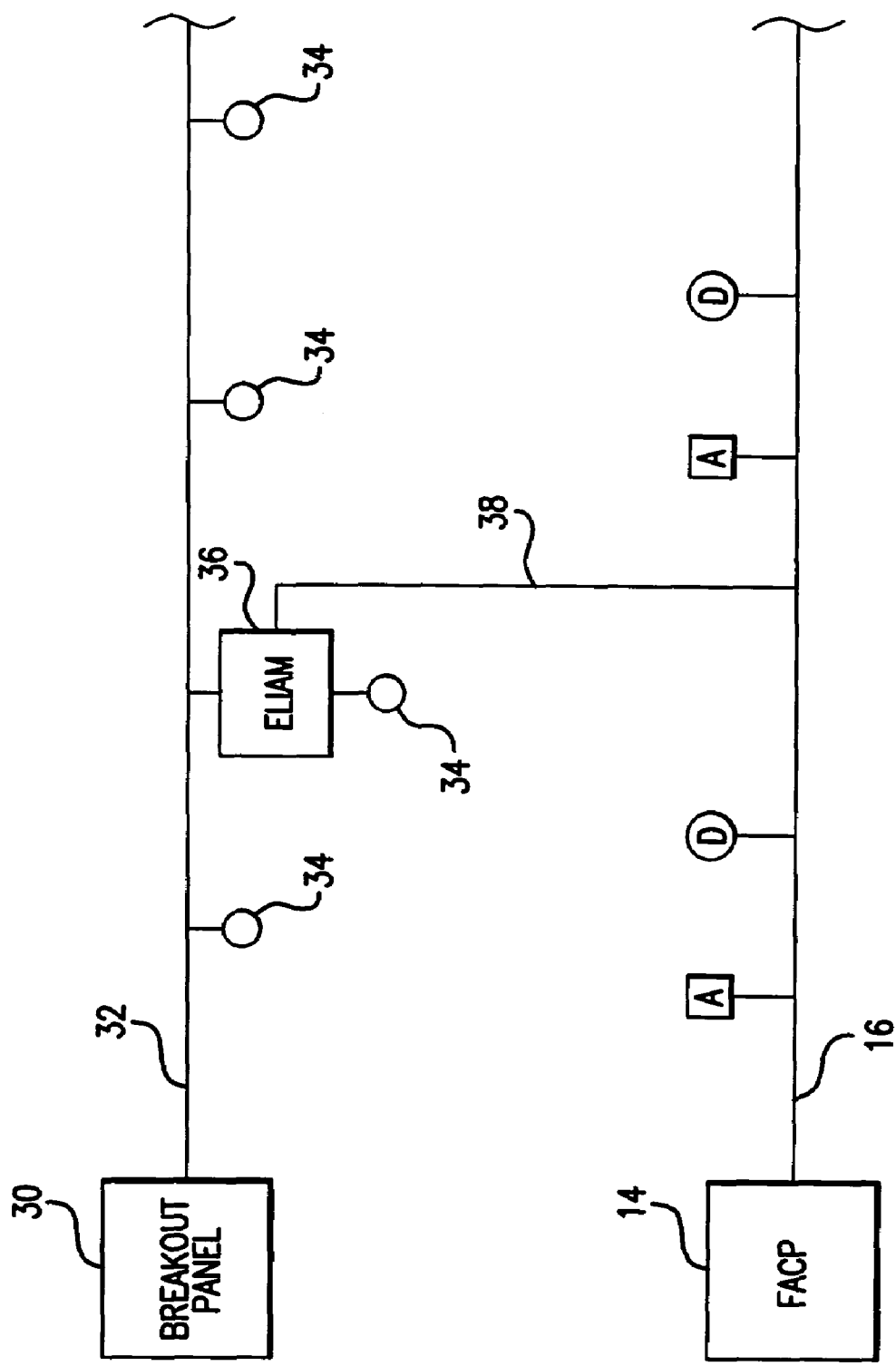
FIG. 2 is a schematic diagram illustrating a system embodying the present invention.

FIG. 2 is a schematic diagram illustrating a system embodying the present invention. For illustrative purposes only, just one SLC 16 is shown, and the single line represents the two wires 18 and 20 of FIG. 1.

A breakout panel 30 supplies power over power line 32 to one or more lights 34, some of which may be designated for emergency lighting. According to an embodiment of the present invention, an ELIAM 36 is attached between the lighting power line 32 and a light 34. The fire alarm network is extended to the ELIAM via connectino 38. The ELIAM thus appears to the control panel (system controller) 14 as another network appliance, and can be controlled by, and report to, the control panel 14.

Figure 3A:
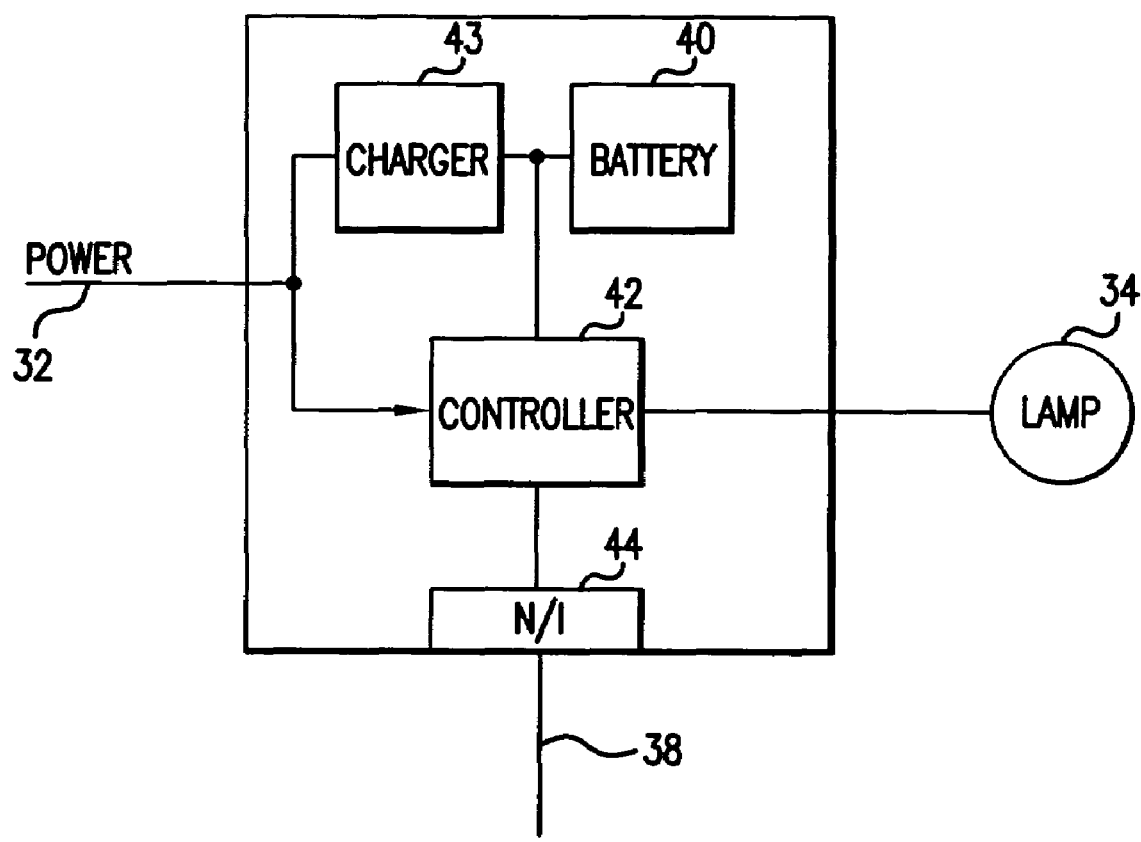
FIG. 3A is a block diagram illustrating a first embodiment of the present invention ELIAM.

FIG. 3A is a block diagram illustrating a first embodiment of the present invention ELIAM. Power is received through power line 32 and is normally routed to power lamp 34. In the event of an AC power loss, a controller 42 causes the lamp 34 to be powered from the backup battery 40.

A network interface 44 connects the unit to the fire alarm network 38. Upon receiving a command via the network interface 44 from the system controller 14 (FIG. 2), the ELIAM controller 42 disconnects the lamp 34 from the power line 32 and instead causes the lamp 34 to be powered from the backup battery 40.

Thus, upon a command to test the backup battery 40, the battery 40 is discharged through the lamp 34. The battery voltage or current draw may be monitored by the controller 42 and the resulting battery or lamp (no current would imply a faulty lamp) information can then be transmitted to the system controller 14.

Alternatively, rather than discharging the battery 40 through the lamp 34, the battery 40 could be discharged through a dummy load (not shown).

Note that in the embodiment of FIG. 3A, the lamp 34 is external to the ELIAM 36. For example, a pre-existing lamp 34 may be disconnected from a power source with the ELIAM 36 of FIG. 3A being inserted between the power line 32 and the lamp 34.

Figure 3B:
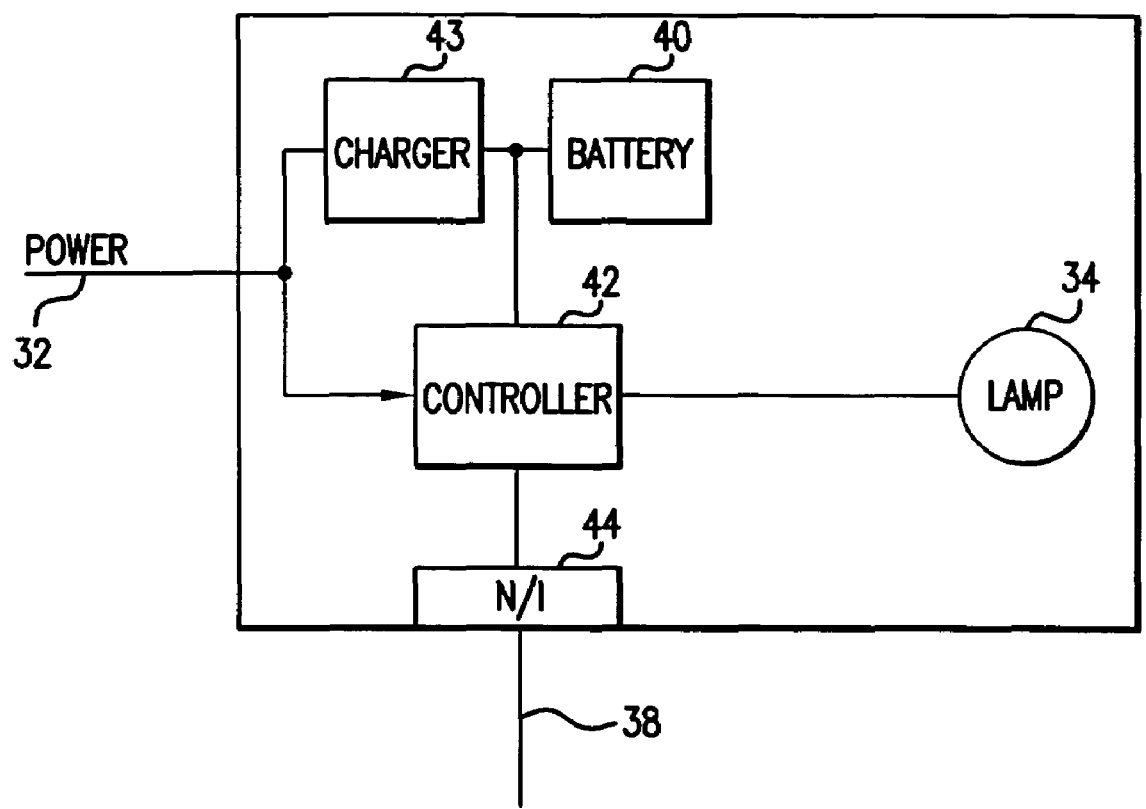
FIG. 3B is a block diagram of an alternative embodiment in which the ELIAM includes a lamp.

FIG. 3B is a block diagram of an alternative embodiment in which the ELIAM 36 includes a lamp 34.

In another embodiment, the fire alarm system can be used to extend battery standby duration. For example, a motion sensor or system of motion sensors can be used to activate emergency lights only when lighting is needed. The sensor is monitored by the fire alarm system, and the fire alarm system commands the ELIAM to activate its light when motion is detected. This conserves available battery capacity for when it is needed rather than consuming capacity when nobody is walking through an area.

Furthermore, a photo sensor could determine if ambient light is sufficient. For example, if a particular corridor is near a window, and daylight is adequate, ELIAMs in the corridor may be controlled to preserve battery capacity.

Similarly, a light sensor may be used to indicate that an emergency light is activated. A properly placed sensor could determine that the lamp actually is energized and providing emergency lighting. Failure of the lamp could thus be reported as a trouble condition.

Since the ELIAM is identified by its system address, a custom label, such as a textual description, can be assigned to the point. This custom label and the system address identify the device and location that require service.

Alternatively, the system can provide the same features and operation described above using a suitably designed notification appliance circuit (NAC) or auxiliary power output point. The required measurement capabilities are described above. In this case, the backup power for the emergency lighting system may come from the fire alarm panel or from a NAC power extender.

Finally, the system provides addressable control of the emergency lighting system, which may be useful during a fire.

While this invention has been particularly shown and described with references to preferred embodiments thereof, it will be understood ty those skilled in the art that various changes in form and details may be made therein without departing from the scope of the invention encompassed by the appended claims.

What is claimed is:

1. An emergency exit lighting unit, comprising:
   a light source for providing illumination of an exit;
   a backup battery;
   a controller that connects the backup battery to the light source upon detection of loss of main power; and
   a network interface which interfaces with and receives commands from a fire alarm controller via a fire alarm network, the emergency lighting unit having a unique identifier with respect to the fire alarm network,
   wherein at least one of the commands from the fire alarm controller comprises a testing command for the controller to test the backup battery.

2. The emergency lighting unit of claim 1, the controller, upon receiving the test command, causing the backup battery to discharge, the controller sensing battery state and forwarding battery state information via the network interface to a network controller.

3. The emergency lighting unit of claim 2, the battery state information comprising an indication of at least one of:
   voltage across the battery and current draw from the battery.

4. The emergency lighting unit of claim 2, wherein the backup battery is discharged through the light source.

5. The emergency lighting unit of claim 2, wherein the backup battery is discharged through a ballast load.

6. The emergency lighting unit of claim 2, wherein the backup battery is discharged for a preset period.

7. The emergency lighting unit of claim 2, wherein discharge of the backup battery begins and ends upon receipt of commands from the network controller.

8. The emergency lighting unit of claim 2, wherein discharge of the backup battery ceases if terminal voltage of the backup battery drops below a predetermined threshold.

9. The emergency lighting unit of claim 8, the controller sending a trouble indication to the network controller when the terminal voltage drops below the threshold.

10. The emergency lighting unit of claim 2, the controller interpreting detection of no or low current during discharge to mean the emergency light source is defective.

11. The emergency lighting unit of claim 2, backup power being delivered via the network while the battery is being discharged.

12. The emergency lighting unit of claim 11, the network controller supplying the backup power.

13. The emergency lighting unit of claim 2, a test log being maintained.

14. The emergency lighting unit of claim 1, wherein said unit is one of plural similar units connected to the network, each uniquely addressed.

15. The emergency lighting unit of claim 14, the plural units being tested on a periodic rotating schedule.

16. The emergency lighting unit of claim 1, wherein plural fire alarm appliances are connected to the network, each uniquely addressed.

17. The emergency lighting unit of claim 16, wherein at least one of the plural fire alarm appliances is at least one of:
   a smoke detector, a fire detector, a pull station, an intrusion detector, a motion sensor, and an audible alarm.

18. The emergency lighting unit of claim 1 wherein the controller, responsive to a command from a network controller, inhibits the light source from turning on during an emergency condition that would normally cause the light source to be on.

19. The emergency lighting unit of claim 18, the light source being inhibited from turning on if ambient light is adequate in the vicinity of the unit.

20. The emergency lighting unit of claim 18, the light source being inhibited if no movement is detected in the vicinity of the unit.

21. The emergency lighting unit of claim 1, the fire alarm controller being a fire alarm control panel.

22. The emergency lighting unit of claim 1, wherein the network is any combination of wired, wireless and optical.

23. The emergency lighting unit of claim 1, further comprising a light sensor to verify that the light source is activated, the controller reporting a detected fault via the network interface.

24. A fire alarm control panel, programmed to monitor and control a fire alarm network, said fire alarm network including at least one emergency exit lighting unit, the emergency exit lighting unit comprising:
   a light source for providing illumination of an exit;
   a backup battery;
   a controller that connects the backup battery to the light source upon detection of loss of main power; and
   a network interface which interfaces with and receives commands from the fire alarm control panel via the fire alarm network, the emergency lighting unit having a unique identifier with respect to the fire alarm network,
   wherein at least one of the commands from the fire alarm control panel comprises a testing command for the controller to test the backup battery.

25. A fire alarm system, comprising:
   a fire alarm control panel;
   a fire alarm network connected to the fire alarm control panel, the fire alarm control panel communicating with fire alarm peripheral devices connected to the fire alarm network;
   an emergency exit lighting unit connected to the fire alarm network, the emergency exit lighting unit comprising:
   a lamp for providing illumination of an exit;
   a backup battery;

a controller that connects the backup battery to the lamp upon detection of loss of main power; and a network interface which interfaces with and receives commands from the fire alarm control panel via the fire alarm network, the emergency lighting unit having a unique identifier with respect to the fire alarm network, wherein at least one of the commands from the fire alarm control panel comprises a testing command for the controller to test the backup battery.

26. In a fire alarm system comprising a fire alarm control panel, a fire alarm network connected to the fire alarm control panel, an emergency exit lighting unit in communication with the fire alarm network, the emergency exit lighting unit comprising a lamp for providing illumination of an exit, a backup battery, a controller that connects the backup battery to the lamp upon detection of loss of main power, and a network interface which interfaces with and receives commands from the fire alarm control panel via the fire alarm network, the emergency lighting unit having a unique identifier with respect to the fire alarm network, a method for testing the emergency exit lighting unit, comprising:

upon receiving a test command from the fire alarm control panel (FACP) via the fire alarm network, the emergency exit lighting unit discharging the backup battery; and reporting, by the emergency exit lighting unit, information about the backup battery acquired during discharge to the FACP.

27. The method of claim 26, the battery state information comprising an indication of at least one of:

voltage across the battery and current draw from the battery.

28. The method of claim 26, wherein the backup battery is discharged through the light source.

29. The method of claim 26, wherein the backup battery is discharged through a ballast load.

30. The method of claim 26, further comprising:

terminating discharge of the backup battery if terminal voltage of the backup battery drops below a predetermined threshold.

31. The method of claim 30, further comprising:

sending a trouble indication to the FACP when the terminal voltage drops below the threshold.

32. The method of claim 26, backup power being delivered via the fire alarm network while the battery is being discharged.

33. The method of claim 26, further comprising:

maintaining a test log.

34. The method of claim 26, wherein plural emergency light sources are connected to the network, each uniquely addressed.

35. The method of claim 34, further comprising:

testing the plural units on a periodic rotating schedule.

36. The method of claim 26, wherein the fire alarm system comprises plural fire alarm peripheral devices; and wherein at least one of the plural fire alarm peripheral devices is at least one of:

a smoke detector, a fire detector, a pull station, and intrusion detector, a motion sensor, and an audible alarm.

37. The method of claim 26, further comprising:

inhibiting, responsive to a command from the FACP, the light source from turning on during an emergency condition that would normally cause the light source to be on.

38. An addressable emergency exit lighting unit comprising:

backup battery means for supplying power to a light source upon loss of main power, the light source for providing illumination of an exit;

network interface means for interfacing with and receiving commands from a fire alarm controller via a fire alarm network, the emergency lighting unit having a unique identifier with respect to the fire alarm network;

discharge means for discharging the backup battery means upon receipt of a test command via the network interface means from a fire alarm control panel (FACP) via the fire alarm network in order to test the backup battery means; and reporting means for reporting information about the backup battery means acquired during discharge to the FACP.

39. The emergency lighting unit of claim 1, wherein a network controller sends a command to the controller to control the light source based on at least one sensor input to the network controller.

40. The emergency lighting unit of claim 39, wherein the network controller sends a command to the controller to prohibit the light source from generating light.

41. The emergency lighting unit of claim 40, wherein the at least one sensor input comprises input from a motion sensor or a photo sensor.

42. The emergency lighting unit of claim 1, wherein the controller, responsive to an override command from a network controller, prohibits the light source from generating light.

43. The emergency lighting unit of claim 1, wherein the emergency lighting unit receives external power from at least two sources.

44. The emergency lighting unit of claim 43, wherein the at least two sources of power comprise a power line and the fire alarm network.

45. The fire alarm control panel of claim 24, wherein the fire alarm control panel sends a command to the controller to control the light source based on at least one sensor input to the fire alarm control panel.

46. The fire alarm control panel of claim 45, wherein the fire alarm control panel sends a command to the controller to prohibit the light source from generating light.

47. The fire alarm control panel of claim 46, wherein the at least one sensor input comprises input from a motion sensor or a photo sensor.

48. The fire alarm control panel of claim 24, wherein the fire alarm control panel sends a command to the controller to prohibit the light source from generating light.

49. The method of claim 26, further comprising:

receiving a command from the FACP via the fire alarm network during a non-test operation to control the emergency lighting.

50. The method of claim 49, wherein the command during the non-test operation comprises a command to prohibit the light source from generating light.

51. The method of claim 50, wherein the command to prohibit the light source from generating light is based on at least one sensor input to the FACP.

* * * * *